Sept. 22, 1936.     L. B. WINTON     2,054,845

MEANS FOR CLOSING RECEPTACLES

Original Filed Oct. 30, 1931    2 Sheets-Sheet 1

INVENTOR
L. B. Winton
BY John O. Seifert
ATTORNEY

Sept. 22, 1936.  L. B. WINTON  2,054,845
MEANS FOR CLOSING RECEPTACLES
Original Filed Oct. 30, 1931  2 Sheets-Sheet 2
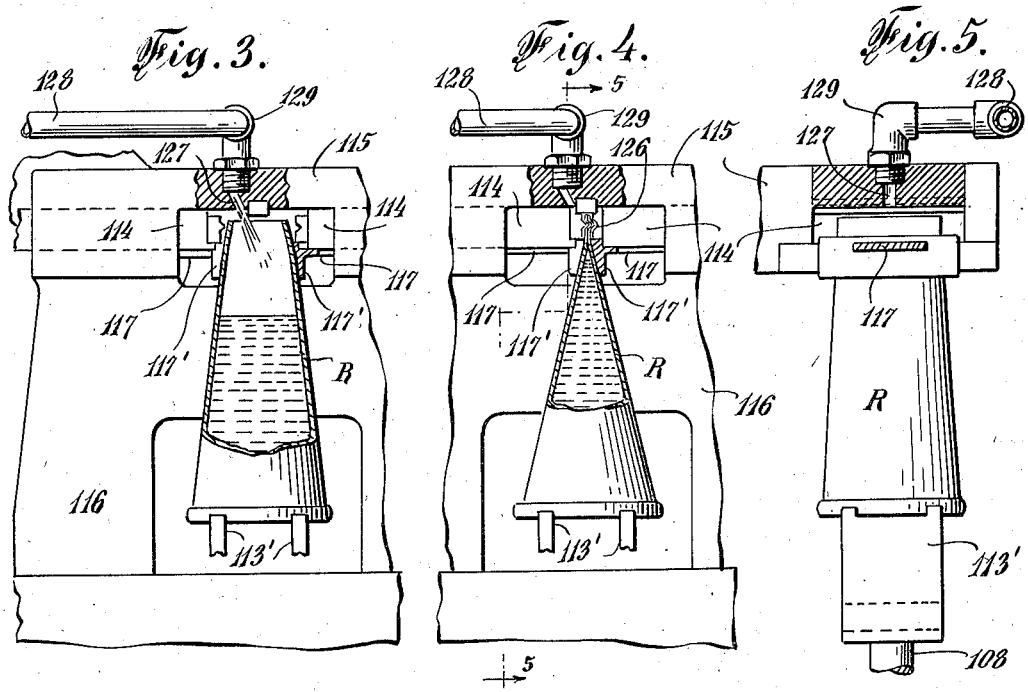
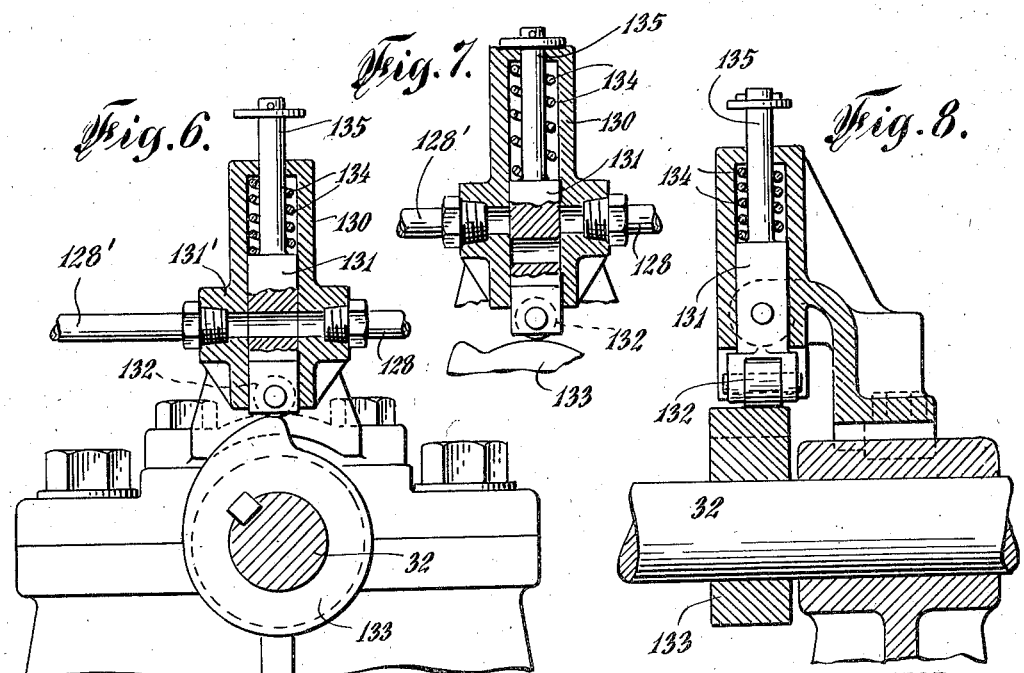
INVENTOR
L. B. Winton
BY John O. Seifert
ATTORNEY Patented Sept. 22, 1936

2,054,845

UNITED STATES PATENT OFFICE 2,054,845

MEANS FOR CLOSING RECEPTACLES

Lewis B. Winton, Greenwich, Conn., assignor to American Sealcone Corporation, New York, N. Y., a corporation of New York Original application October 30, 1931, Serial No. 571,965. Divided and this application December 1, 1933, Serial No. 700,420

3 Claims. (Cl. 226—56)

This invention relates to apparatus for filling and closing receptacles, and while it is adapted for the filling and sealing of various materials into receptacles, it is adapted for the packaging of edible commodities as fruit juices and particularly the juice of citrus fruits, such as orange juice.

As is well known in the squeezing of juice from oranges, air is entrained and mixed with the juice, and that orange juice in the presence of air will quickly deteriorate and spoil. To overcome the contamination of the orange juice by contact with air the orange juice is treated to free it of entrained air and it is stored in said condition out of contact with air.

The present invention is for an improved method of and means to close and displace air by an inert gas above the contents in a receptacle before closing the same to be used in connection with apparatus for filling material into receptacles while maintaining the material out of contact with air and prevent the entrainment and mixing of air with the material during the filling thereof into a receptacle, the subject-matter of the present application being divided out from my co-pending application Serial No. 571,965, filed October 30, 1931.

The invention is particularly adapted for the filling and closing of receptacles as disclosed in Letters Patent No. 1,699,549, issued January 22, 1929, wherein the open end of the receptacle is closed after the material is filled into the receptacle by squeezing together the opposite wall portions at the open end and sealed in closed condition by engaging a V-shaped closure member over and clamping the same to the closed receptacle end, the closing of the receptacle and applying of the closure member thereto being effected by means as disclosed, for instance, in Letters Patent No. 1,871,701, issued August 16, 1932. The quantity of material filled into the receptacle is less than the capacity of the receptacle with the result that the receptacle is not entirely filled so that when the receptacle is closed there is a space above the material filled with air, which air, if retained in the receptacle in the packaging of edible commodities and particularly the juice of citrus fruits will contaminate and effect a deterioration and spoiling of the commodity in the receptacle.

It is an object of the present invention to provide at the closing means in apparatus for filling and closing receptacles, means connected with an inert gas supply to inject and displace the air above the contents of the receptacle with such gas prior to closing the receptacle.

In the drawings accompanying and forming a part of this application, Figure 1 is a front elevation of receptacle collapsing means to close the same and closure member applying means, only so much being shown as is essential to an understanding of the invention and having combined therewith means connected with an inert gas supply for injecting and displacing air above the contents of the receptacle with said gas prior to closing a receptacle.

Figure 3 is a detail view, partly in section, to show the manner of ejecting the inert gas into and displacing the air by the gas in the space above the contents of a receptacle.

Figure 4 is a view similar to Figure 3, but showing the receptacle after it has been closed and sealed.

Figure 5 is a view taken substantially on the line 5—5 of Figure 4 looking in the direction of the arrows.

Figure 6 is a sectional view, on an enlarged scale, taken substantially on the line 6—6 of Figure 1 looking in the direction of the arrows, and showing the means to control the connection of the inert gas supply with the means to displace the air by said gas above the contents of a receptacle and showing the same open to the gas supply.

Figure 7 is a view similar to Figure 6, but showing the parts in position to shut off the gas supply.

Figure 8 is a vertical sectional view taken substantially centrally through Figure 6.

In the embodiment of the invention illustrated, the operative mechanism for carrying out the invention is mounted upon a table T supported by standards, as S, and driven from a suitable source of power (not shown) connected with a drive shaft 32.

Figure 1:
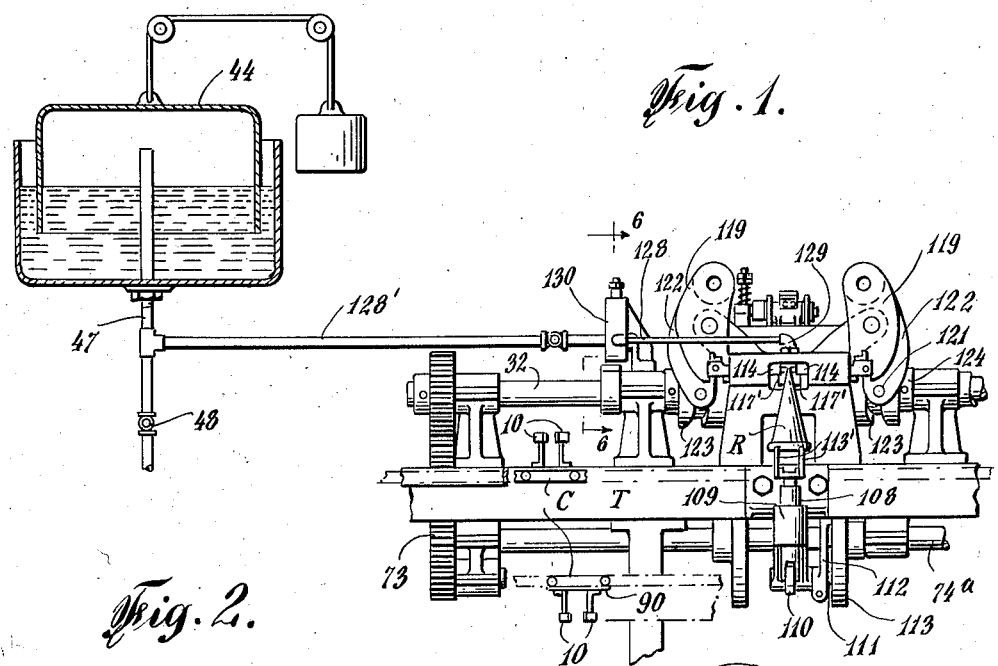
Figure 2:
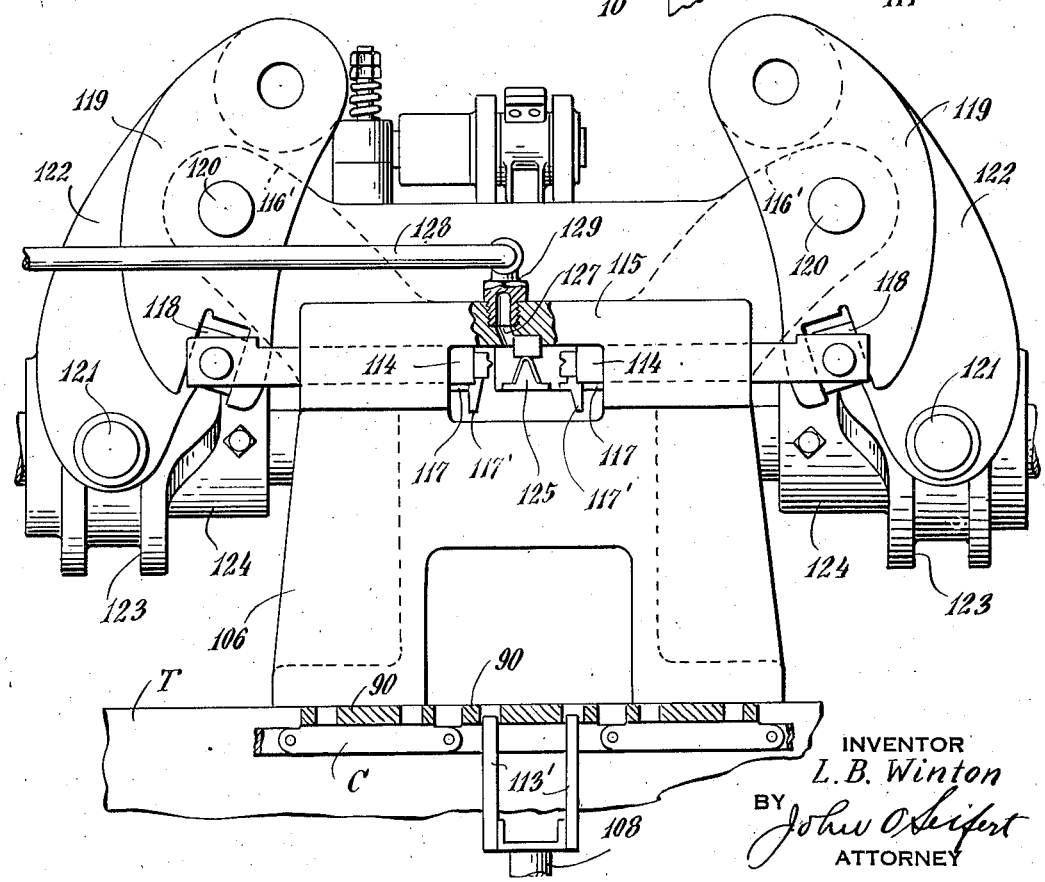
Figure 2 is a front elevation, on an enlarged scale, of the receptacle collapsing means and showing in section the connection of the inert gas supply thereto.

The filler means (not shown) is arranged at the left hand end of the table and the receptacles are transferred from the filler means onto receptacle supports in the form of plates 90 of an intermittently operative conveyer C between a pair of resilient fingers 10 extended up from said supporting plates and transported by the conveyer to the receptacle collapsing and closure member applying means (Figures 1 and 2) comprising a pair of slides 114 slidably mounted to have movement toward and away from each other in a portion 115, overhanging and in spaced relation to the conveyer, of a head 116 mounted on the table T and a pair of slides 117 slidably carried by and below the first slides to participate in the movement thereof and have independent movement relative to the first slides, the second slides being normally urged to engage heads 117' carried thereby forward of the first slides with a receptacle. The slides 114 pivotally carry blocks slidably engaging in recesses, as at 118, in lever arms 119 pivotally supported at 120 in upwardly and laterally projecting extensions 116' of the head 116, and said lever arms being rocked by rollers carried by studs 121 fixed in and extended laterally from lever arms 122 integral or connected with the arms 119, said rollers engaging cam grooves 123 in drums 124 fixed to the shaft 32, whereby the levers 119, 122 are oscillated and the connected slides 114 reciprocated toward and away from each other. The slides are normally in spaced position as shown in Figure 2, and means are provided to lift a receptacle from a receptacle support of the conveyer and position the open end thereof between the slides 114, 117 for action thereon by said slides, said means comprising a plunger 108 mounted in a bracket 109 fixed to the side of table T to have vertical sliding movement and reciprocated in timed sequence with the movement of the conveyer and actuation of the slides 114, 117 by an arm 110 fixed to a shaft 111 rotatably mounted in downwardly extended arms of the bracket and rocked by an arm 112 carrying a roller following a cam groove in a disk 113 fixed to a shaft 74a rotated from shaft 32 through a train of gears 73, the plunger at the upper end carrying a pair of spaced plates 113' to move through openings in the receptacle supporting plates 90 of the conveyer and arranged to engage and lift a receptacle from the conveyer and position the same between the slides, as shown in Figure 3, when the slides are actuated, the head 117' of slides 117 engaging with and collapsing the receptacle and when collapsed a closure member of V-shape in cross section is guided by a guide 125, (Figure 2), conforming to the shape of the closure member, over the collapsed receptacle end when the slides 114 are brought into engagement with the closure member to clamp and seal the closure member to the collapsed receptacle end, as shown at 126 in Figure 4.

As shown in Figure 3 the receptacles are not filled to capacity with the result that when the receptacle is closed there is an air space above the contents in the receptacle, as shown in Figure 4. In the packaging of orange juice the air in said space will contaminate and cause the orange juice to spoil. To overcome this disadvantage prior to closing the receptacle, the air above the contents in the receptacle is displaced by and the space filled with an inert gas, such as carbondioxide or nitrogen, so that when the receptacle is closed any space not displaced by the juice is filled with the inert gas. For this purpose means in the form of a jet or nozzle connected with a source of inert gas supply under pressure is arranged between the slides 114, 117. This jet or nozzle comprises a perforation or port 127 extended through the overhanging portion 115 of the head 116 adjacent the forward end of a slide 114 and inclines in a direction toward the opposite slide 114 so as to direct the gas stream from said jet into the top of a receptacle adjacent one side and directing it toward the opposite side of the receptacle. The port 127 is connected in the present instance with a gasometer 44 containing the gas by a pipe 128 connected with a nipple 129 threaded into the port 127, in the present instance through an elbow and a short pipe length, as shown in Figure 5, although said pipe 128 may be connected directly with the nipple. The pipe 128 is connected with a pipe 47 leading to the bell 44 and from a source of gas supply, said pipe having a valve 48 interposed therein to shut off the same when the nozzle is connected with the gasometer. The pipe 128 is connected with an outlet port from a chamber in a valve casing 130 connected with the gasometer by a pipe 128' connected with the pipe 47 and an inlet port to the chamber in the valve casing 130 in axial alinement with the outlet port to which the pipe 128 is connected. The connection of the jet or nozzle 127 is controlled by a valve in the valve casing to shut off and open communication between the inlet and outlet ports of the valve casing, said valve being in the form of a block 131 slidable in the chamber of the valve casing and having a port 131' therethrough adapted to be placed into and out of register with the inlet and outlet ports of the valve casing, said valve being normally urged to position the port therein out of register with the ports in the valve casing and cause a roller 132 rotatably carried by a bifurcated portion of the valve extended from the bottom of the valve casing to engage and follow a cam 133, fixed on the shaft 32, by a spring 134 coiled about a stem 135 extended through the end wall of a portion extended upward from the valve casing and in which the spring is enclosed. The cam 133 is arranged to actuate the valve against the tension of spring 134 to open the jet or nozzle 127 in timed sequence with the actuation of the receptacle collapsing slides 117.

The closure member for the receptacle has a portion extended from opposite ends beyond the opposite sides of the receptacle and adapted to be folded about the ends of the closure member by means relative to which a receptacle is stationed by the conveyer and lifted from the conveyer to present it to said means by a plunger similar in construction and operation to the plunger 108, but as said mechanism does not constitute an essential feature of the present invention, illustration and description thereof is not deemed necessary. While I have illustrated and described one embodiment of my invention it will be obvious that various modifications may be made in construction and arrangement of parts without departing from the scope of the invention.

Having thus described my invention, I claim:

1. In means to close the filler opening of receptacles, means between which the open end of the receptacle is adapted to be engaged operative to squeeze together the opposite wall portions at the receptacle opening, a nozzle having a valve controlled connection with an inert gas supply arranged to direct the stream therefrom into the opening of the receptacle positioned relative to the closing means, and means to actuate the receptacle closing means and in timed sequence therewith actuate the nozzle valve to deliver inert gas into and displace air above the contents of the receptacle.

2. In receptacle closing apparatus, means to squeeze together the opposite wall portions at the filler opening of the receptacle to close the same, and seal a closure member on the closed receptacle end, an inert gas supply, a nozzle arranged at the closing means having a connection with the gas supply, a valve to shut off and connect the nozzle with the gas supply, and means to actuate the nozzle valve to control the connection of the gas supply with the nozzle adapted to actuate said valve to open the nozzle to the inert gas supply just prior to the actuation of the closing means to completely close the receptacle opening to deliver inert gas to and displace thereby the air above the contents in the receptacle and shut off the gas supply from the nozzle when the receptacle opening is closed, and a part of the receptacle closing means then being operative to clamp and liquid seal a closure member to the closed receptacle end applied thereto.

3. In apparatus of the class specified, means relative to which the open end of a receptacle is adapted to be positioned to squeeze together the opposite wall portions at the mouth to close the same, an inert gas supply under pressure, a nozzle connected with the gas supply arranged above the receptacle closing means and the open end of a receptacle positioned relative thereto, and a valve to control the connection of the nozzle with the gas supply, and means to actuate the valve in timed sequence with the actuation of the receptacle closing means to open the nozzle to the gas supply and inject gas into and displace the air in the receptacle above the contents thereof by said gas and shut off the nozzle from the gas supply.

LEWIS B. WINTON.